US012420249B2

(12) United States Patent
Ren et al.

(10) Patent No.: US 12,420,249 B2
(45) Date of Patent: Sep. 23, 2025

(54) FERTILIZER MIXER

(71) Applicant: Henan Agricultural University, Zhengzhou (CN)

(72) Inventors: Tianbao Ren, Zhengzhou (CN); Yuewei Wei, Zhengzhou (CN); Andong Song, Zhengzhou (CN); Maosen Li, Zhengzhou (CN); Quanyu Yin, Zhengzhou (CN); Xiaoming Ji, Zhengzhou (CN); Guoshun Liu, Zhengzhou (CN)

(73) Assignee: HENAN AGRICULTURAL UNIVERSITY, Zhengzhou (CN)

( * ) Notice: Subject to any disclaimer, the term of this patent is extended or adjusted under 35 U.S.C. 154(b) by 1019 days.

(21) Appl. No.: 17/497,970

(22) Filed: Oct. 10, 2021

(65) Prior Publication Data

US 2022/0111341 A1 Apr. 14, 2022

(30) Foreign Application Priority Data

Oct. 10, 2020 (CN) ......................... 202011076651.0

(51) Int. Cl.
*B01F 35/12* (2022.01)
*B01F 31/00* (2022.01)
*B01F 31/441* (2022.01)
*B01F 35/41* (2022.01)

(52) U.S. Cl.
CPC ............ *B01F 35/12* (2022.01); *B01F 31/441* (2022.01); *B01F 31/70* (2022.01); *B01F 35/4113* (2022.01)

(58) Field of Classification Search
CPC ...... B01F 35/12; B01F 35/121; B01F 35/122; B01F 35/123; B01F 35/10; B01F 31/441; B01F 27/627; B01F 27/805
See application file for complete search history.

(56) References Cited

U.S. PATENT DOCUMENTS 1,488,941 A * 4/1924 Roxs ........................ A21C 1/02 366/97
2,645,465 A * 7/1953 Karlstrom ............. A47J 43/044 366/95

(Continued)

FOREIGN PATENT DOCUMENTS

DE 4012017 C1 * 6/1991
GB 648420 A * 1/1951

*Primary Examiner* — Marc C Howell
(74) *Attorney, Agent, or Firm* — MATTHIAS SCHOLL P.C.; Matthias Scholl

(57) ABSTRACT

A fertilizer mixer includes a housing, a plurality of supporting rods, a roof plate, a mixing room, a lifting mechanism, a stirring mechanism, a control mechanism, a driving mechanism, and a cleaning mechanism. The housing includes a top end and one end of each of the plurality of supporting rods is disposed on the top end. The roof plate is disposed on the other end of each of the plurality of supporting rods. The stirring mechanism is fixed on the roof plate. The mixing room includes a bottom wall and the housing includes an inner bottom surface. The mixing room includes a discharge port disposed on the bottom wall, and a seal plug disposed in the discharge port. The lifting mechanism is disposed between the bottom wall and the inner bottom surface and an outer sidewall of the mixing room abuts against an inner sidewall of the housing.

8 Claims, 2 Drawing Sheets

(56) References Cited

U.S. PATENT DOCUMENTS

| | | | | |
|---|---|---|---|---|
| 3,421,741 | A * | 1/1969 | Oswald | B01F 27/805<br>366/208 |
| 5,090,815 | A * | 2/1992 | Bohle | B01F 27/1123<br>366/196 |
| 2013/0341446 | A1 * | 12/2013 | Farrell | A47J 43/0705<br>366/203 |
| 2017/0312708 | A1 * | 11/2017 | Muhs | B01F 27/191 |

* cited by examiner

FERTILIZER MIXER

CROSS-REFERENCE TO RELATED APPLICATIONS

Pursuant to 35 U.S.C. § 119 and the Paris Convention Treaty, this application claims foreign priority to Chinese Patent Application No. 202011076651.0 filed Oct. 10, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a fertilizer mixer.

Usually multiple components are blended in a fertilizer mixer until they are homogenous, thus yielding a fertilizer. But the components may stick to mixing arms during mixing process, which lowers mixing uniformity and increases the residual of raw materials, and the mixing arms are difficult to clean.

In addition, during mixing, a part of the fertilizer is pressed firmly on the plurality of mixing arms so that removing the residual fertilizer is time-consuming, expensive, and laborious.

SUMMARY

The disclosure provides a fertilizer mixer comprising a housing, a plurality of supporting rods, a roof plate, a mixing room, a lifting mechanism, a stirring mechanism, a control mechanism, a driving mechanism, and a cleaning mechanism; the housing comprises a top end and one end of each of the plurality of supporting rods is disposed on the top end; the roof plate is disposed on the other end of each of the plurality of supporting rods; the stirring mechanism is fixed on the roof plate; the mixing room comprises a bottom wall and the housing comprises an inner bottom surface; the mixing room comprises a discharge port disposed on the bottom wall, and a seal plug disposed in the discharge port; the lifting mechanism is disposed between the bottom wall and the inner bottom surface and an outer sidewall of the mixing room abuts against an inner sidewall of the housing; the cleaning mechanism is disposed over the stirring mechanism; the stirring mechanism comprises a stirring part and a rotating rod; the stirring part extends into the mixing room and the rotating rod is configured to trigger the control mechanism; the control mechanism is electrically connected to the stirring mechanism and the driving mechanism.

In a class of this embodiment, the stirring mechanism comprises a rotating shaft, a plurality of stirring rods, and a driving member; the rotating shaft is flexibly connected through a first bearing to the roof plate; the rotating shaft is connected to the driving member in a transmission way; and the plurality of stirring rods is disposed on two sides of the rotating shaft.

In a class of this embodiment, the driving member comprises a reciprocating motor, a driving wheel, and a driven wheel; the reciprocating motor is fixed on the roof plate; an output terminal of the reciprocating motor is connected to the driving wheel; the driven wheel is connected to the rotating shaft; and the driving wheel is engaged with the driven wheel.

In a class of this embodiment, the cleaning mechanism comprises a U-shaped rod, four cleaning members, and a plurality of fixing rods; the driving mechanism comprises a movable end and the U-shaped rod is fixedly connected to the movable end; the U-shaped rod comprises a bottom end and the plurality of fixing rods are fixedly connected to the bottom end; the four cleaning members are fixedly connected to the plurality of fixing rods and are divided into two groups opposite to each other to clean two sets of the corresponding stirring rods, respectively.

In a class of this embodiment, the driving mechanism comprises a frame, a drive motor, a leadscrew, and a threaded sleeve; the frame comprises a lower portion and the drive motor is disposed on the lower portion; an output of the drive motor is connected to the leadscrew; the leadscrew comprises a distal end away from the drive motor and the distal end is connected through a second bearing to an upper portion of the frame; the threaded sleeve is disposed around the leadscrew and is connected to the U-shaped rod via a connection rod.

In a class of this embodiment, the lifting mechanism comprises a first controller and a telescopic cylinder; the first controller comprises a switch button and is electrically connected to the telescopic cylinder; and an output end of the telescopic cylinder is fixedly connected to the bottom wall of the mixing room.

In a class of this embodiment, the control mechanism comprises a first conductive block, a second conductive block, a second controller, and a power supply; the first conductive block is movable and is connected to the rotating rod; the second conductive block is immovable and abuts against the first conductive block; the first conductive block and the power supply are electrically connected to the second controller; and the second conductive block is electrically connected to the power supply.

The following advantages are associated with the fertilizer mixer of the disclosure: the cleaning mechanism is used in conjunction with the driving mechanism and the stirring mechanism to remove the fertilizer from the plurality of stirring rods; when the telescopic cylinder extends and retracts, the mixing room is vibrated, contributing to an even mix of the fertilizer at the bottom of the mixing room. In conventional fertilizer mixers, a part of the fertilizer is pressed firmly on the plurality of stirring rods so that removing the residual fertilizer is time-consuming, expensive, and laborious.

Figure 1:
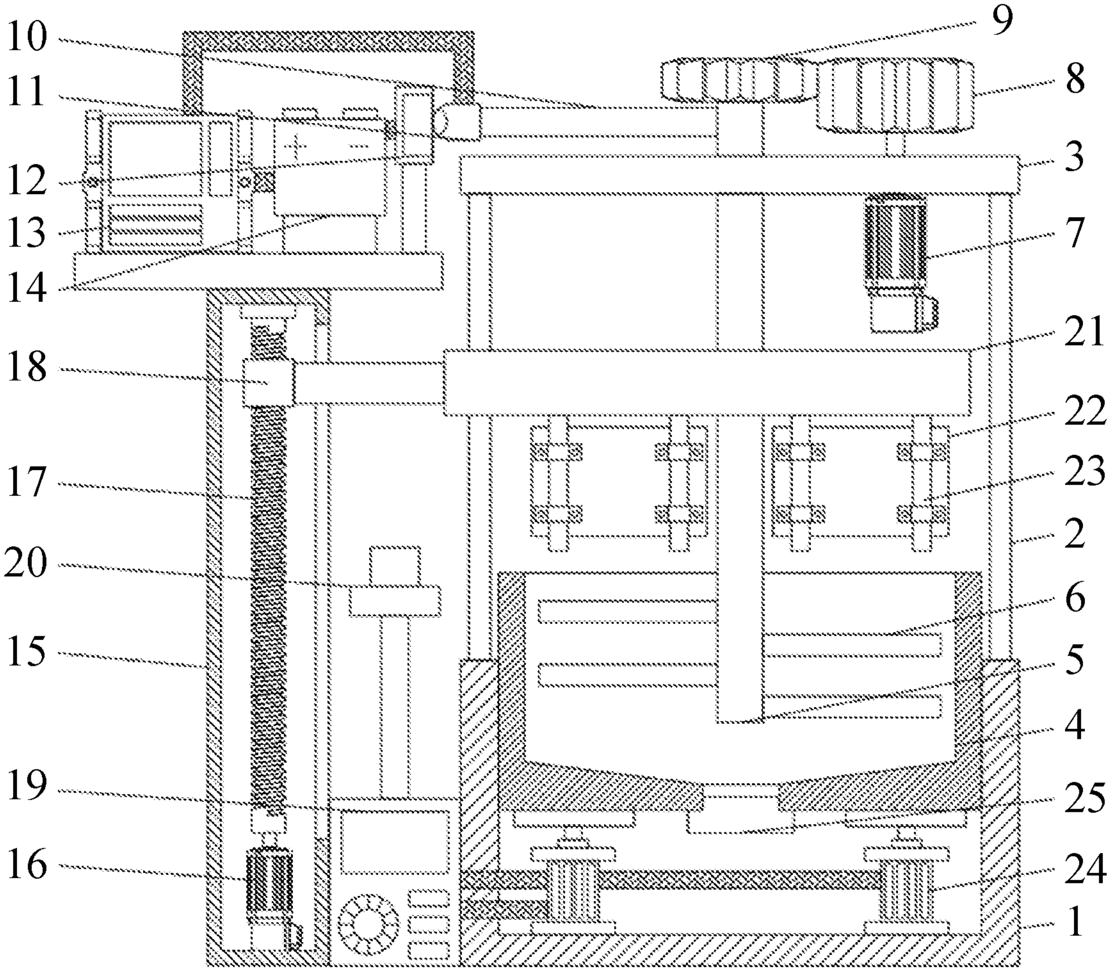
FIG. 1 is a perspective view of a fertilizer mix according to one embodiment of the disclosure.

In the drawings, the following reference numbers are used: 1. Housing; 2. Supporting rod; 3. Roof plate; 4. Mixing room; 5. Rotating shaft; 6. Stirring rod; 7. Reciprocating motor; 8. Driving wheel; 9. Driven wheel; 10. Rotating rod; 11. First conductive block; 12. Second conductive block; 13. Second controller; 14. Power supply; 15. frame; 16. Motor; 17. Leadscrew; 18. Threaded sleeve; 19. First controller; 20. Switch button; 21. U-shaped rod; 22. Cleaning member; 23. Fixing rod; 24. Telescopic cylinder; and 25. Seal plug.

DETAILED DESCRIPTION

To further illustrate the disclosure, embodiments detailing a fertilizer mixer are described below. It should be noted that the following embodiments are intended to describe and not to limit the disclosure.

Example 1

Figure 2:
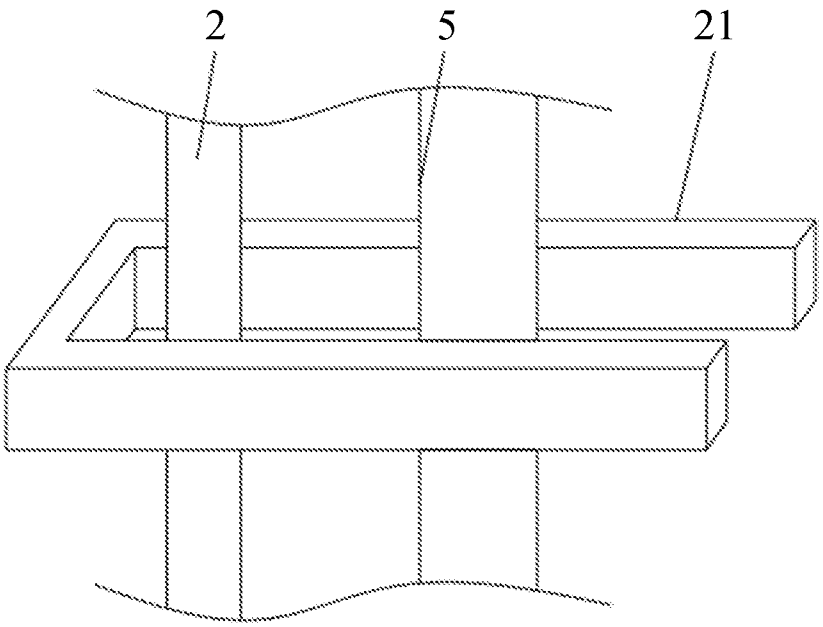
FIG. 2 is a perspective view of a U-shaped rod according to one embodiment of the disclosure.
Figure 3:
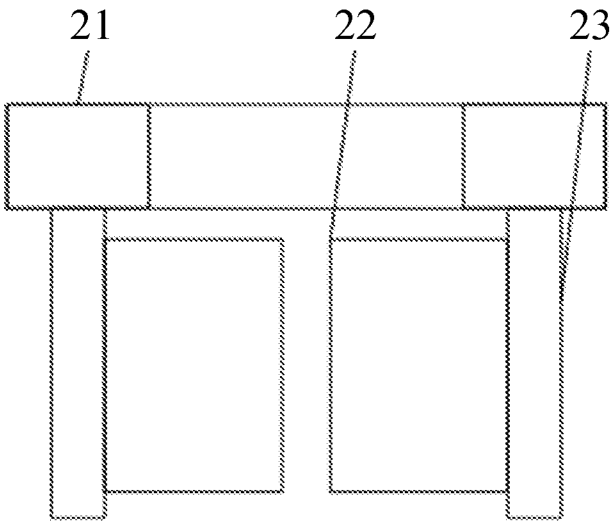
FIG. 3 is a side view of a U-shaped rod according to one embodiment of the disclosure.

Referring to FIGS. 1-3, a fertilizer mixer comprises a housing 1, a plurality of supporting rods 2, a roof plate 3, a mixing room 4, a lifting mechanism, a stirring mechanism, a control mechanism, a driving mechanism, and a cleaning mechanism. The housing 1 comprises a top end and one end of each of the plurality of supporting rods 2 is disposed on the top end. The roof plate 3 is disposed on the other end of each of the plurality of supporting rods 2. The stirring mechanism is fixed on the roof plate 3. The mixing room 4 comprises a bottom wall and the housing 1 comprises an inner bottom surface. The lifting mechanism is disposed between the bottom wall and the inner bottom surface and the outer sidewall of the mixing room abuts against the inner sidewall of the housing. The cleaning mechanism is disposed over the stirring mechanism. The stirring mechanism comprises a stirring part and a rotating rod 10. The stirring part extends into the mixing room 4 and the rotating rod 10 is configured to trigger the control mechanism. The control mechanism is electrically connected to the stirring mechanism and the driving mechanism.

Optionally, the stirring mechanism comprises a rotating shaft 5, a plurality of stirring rods 6, and a driving member. The rotating shaft 5 is flexibly connected through a first bearing to the roof plate 3. The rotating shaft 5 is connected to the driving member in a transmission way. The plurality of stirring rods 6 are disposed on two sides of the rotating shaft 5.

The driving member comprises a reciprocating motor 7, a driving wheel 8, and a driven wheel 9. The reciprocating motor 7 is fixed on the roof plate 3. An output terminal of the reciprocating motor 7 is connected to the driving wheel 8. The driven wheel 9 is connected to the rotating shaft 5. The driving wheel 8 is engaged with the driven wheel 9.

The cleaning mechanism is configured to clean the plurality of stirring rods 6. Optionally, the cleaning mechanism comprises a U-shaped rod 21, four cleaning members 22, and a plurality of fixing rods 23. The driving mechanism comprises a movable end and the U-shaped rod 21 is fixedly connected to the movable end. The U-shaped rod 21 comprises a bottom end and the plurality of fixing rods 23 are fixedly connected to the bottom end. The four cleaning members 22 are fixedly connected to the plurality of fixing rods 23 and are divided into two groups disposed opposite to each other to clean the plurality of stirring rods 6 on two sides of the rotating shaft, respectively. When the rotating shaft 5 stops rotating, the two groups of cleaning members 22 are directly above the two sets of the stirring rods 6.

The driving mechanism is configured to lower the cleaning member. Optionally, the driving mechanism comprises a frame 15, a drive motor 16, a leadscrew 17, and a threaded sleeve 18. The frame 15 comprises a lower portion and the drive motor 16 is disposed on the lower portion. An output of the drive motor 16 is connected to the leadscrew 17. The leadscrew comprises a distal end away from the drive motor 16 and the distal end is connected through a second bearing to an upper portion of the frame 15. The threaded sleeve 18 is disposed around the leadscrew 17 and is connected to the U-shaped rod 21 via a connection rod.

The lifting mechanism is configured to lift and lower the four cleaning members 22. Optionally, the lifting mechanism comprises a first controller 19 and a telescopic cylinder 24. The first controller 19 comprises a switch button 20 and is electrically connected to the telescopic cylinder 24. An output end of the telescopic cylinder 24 is fixedly connected to the bottom wall of the mixing room 4.

The control mechanism is configured to stop the reciprocating motor 7 and start the drive motor 16. Optionally, the control mechanism comprises a first conductive block 11, a second conductive block 12, a second controller 13, and a power supply 14. The first conductive block 11 is movable and is connected to the rotating rod 10. The second conductive block 12 is immovable and abuts against the first conductive block 11. The first conductive block 11 and the power supply 14 are electrically connected to the second controller 13. The second conductive block 12 is electrically connected to the power supply 14. The second controller 13 is configured to stop and start the reciprocating motor 7 and the drive motor 16.

Example 2

A second example of a fertilizer mixer is described as below. The mixing room 4 comprises a discharge port disposed on the bottom wall. The fertilizer mixer comprises a seal plug 25 disposed in the discharge port. The discharge port is configured to release the fertilizer.

The working principle of the fertilizer mixer is detailed as follows. When the reciprocating motor 7 is powered on, the rotating shaft 5 rotates, causing the plurality of stirring rods 6 to operate. As the rotating shaft 5 rotates, the rotating rod 10 rotates, causing the first conductive block 11 to move as well. When the first conductive block 11 abuts against the second conductive block 12, the second controller 13 is powered by the power supply 14 to stop the reciprocating motor 7 and start the drive motor 16. The rotation of the drive motor 16 causes the leadscrew 17 to rotate, thus lifting or lowering the threaded sleeve 18 and the four cleaning members 22 at the same time. The four cleaning members 22 move down and encircle the plurality of stirring rods 6 from two sides to remove the fertilizer thereon. At the same time, the switch button 20 is pressed to turn on the first controller 19. The first controller 19 controls the telescopic cylinder 24 to retract and lower the mixing room 4 so that the plurality of stirring rods 6 is separated from the fertilizer in the mixing room 4. When the four cleaning members 22 moves up, the plurality of stirring rods 6 is cleaned again and the switch button 20 is released to extend the telescopic cylinder 24. The mixing room 4 is lifted so that the plurality of stirring rods 6 extends into the fertilizer. The four cleaning members 22 return to their original position and the reciprocating motor 7 is restarted. The plurality of stirring rods 6 rotates and then is cleaned, repeating the process until the multiple components are homogenous. The mixing room is vibrated as the telescopic cylinder 24 extends and retracts, contributing to an even mix of the fertilizer at the bottom of the mixing room.

It will be obvious to those skilled in the art that changes and modifications may be made, and therefore, the aim in the appended claims is to cover all such changes and modifications.

What is claimed is:

1. A device, comprising:

a housing;

a plurality of supporting rods;

a roof plate;

a mixing room;

a lifting mechanism;

a stirring mechanism;

a control mechanism comprising a first conductive block and a second conductive block;

a driving mechanism; and a cleaning mechanism;

wherein:

the housing comprises a top end and one end of each of the plurality of supporting rods is disposed on the top end, and the roof plate is disposed on the other end of each of the plurality of supporting rods;

the stirring mechanism is fixed on the roof plate;

the mixing room comprises a bottom wall and the housing comprises an inner bottom surface; the mixing room comprises a discharge port disposed on the bottom wall, and a seal plug disposed in the discharge port;

the lifting mechanism is disposed between the bottom wall and the inner bottom surface and an outer sidewall of the mixing room abuts against an inner sidewall of the housing;

the cleaning mechanism is disposed over the stirring mechanism;

the stirring mechanism comprises a stirring part and a rotating rod; the stirring part extends into the mixing room and the rotating rod is configured to move the first conductive block to abut against the second conductive block; and the control mechanism is electrically connected to the stirring mechanism and the driving mechanism.

2. The device of claim 1, wherein the stirring mechanism comprises a rotating shaft, a plurality of stirring rods, and a driving member; the rotating shaft is flexibly connected through a first bearing to the roof plate; the rotating shaft is connected to the driving member via a transmission; and the plurality of stirring rods is disposed on two sides of the rotating shaft.

3. The device of claim 2, wherein the driving member comprises a motor, a driving wheel, and a driven wheel; the motor is fixed on the roof plate; an output terminal of the motor is connected to the driving wheel; the driven wheel is connected to the rotating shaft; and the driving wheel is engaged with the driven wheel.

4. The device of claim 2, wherein the cleaning mechanism comprises a U-shaped rod, four cleaning members, and a plurality of fixing rods; the driving mechanism comprises a movable end and the U-shaped rod is fixedly connected to the movable end; the U-shaped rod comprises a bottom end and the plurality of fixing rods are fixedly connected to the bottom end; and the four cleaning members are fixedly connected to the plurality of fixing rods and are divided into two groups opposite to each other to clean the plurality of stirring rods on two sides of the rotating shaft, respectively.

5. The device of claim 4, wherein the driving mechanism comprises a frame, a drive motor, a leadscrew, and a threaded sleeve; the frame comprises a lower portion and the drive motor is disposed on the lower portion; an output of the drive motor is connected to the leadscrew; the leadscrew comprises a distal end away from the drive motor and the distal end is connected through a second bearing to an upper portion of the frame; and the threaded sleeve is disposed around the leadscrew and is connected to the U-shaped rod via a connection rod.

6. The device of claim 1, wherein the lifting mechanism comprises a first controller and a telescopic cylinder; the first controller comprises a switch button and is electrically connected to the telescopic cylinder; and an output end of the telescopic cylinder is fixedly connected to the bottom wall of the mixing room.

7. The device of claim 1, wherein the control mechanism further comprises a controller and a power supply; the first conductive block is movable and is connected to the rotating rod; the second conductive block is immovable and abuts adapted to be abut against the first conductive block; the first conductive block and the power supply are electrically connected to the controller; and the second conductive block is electrically connected to the power supply.

8. The device of claim 7, wherein when the first conductive block abuts against the second conductive block, the controller is powered on by the power supply.

* * * * *